(12) United States Patent
Li

(10) Patent No.: US 6,570,732 B1
(45) Date of Patent: May 27, 2003

(54) METHOD AND APPARATUS FOR SETTLING DETERMINATION CONTROL SYSTEMS

(75) Inventor: Aihua E. Li, San Jose, CA (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 09/467,095

(22) Filed: Dec. 10, 1999

Related U.S. Application Data
(60) Provisional application No. 60/112,264, filed on Dec. 15, 1998.

(51) Int. Cl.$^7$ .............................................. G11B 5/596
(52) U.S. Cl. .................................................. 360/77.02
(58) Field of Search ........................ 360/60, 75, 77.01, 360/77.05, 77.07, 77.02, 78.01, 78.04, 78.07; 318/561

(56) References Cited

U.S. PATENT DOCUMENTS

| | | | |
|---|---|---|---|
| 4,679,103 A | | 7/1987 | Workman ..................... 360/77 |
| 5,859,742 A | * | 1/1999 | Takaishi ................... 360/78.01 |
| 6,243,226 B1 | * | 6/2001 | Jeong ....................... 360/78.07 |

OTHER PUBLICATIONS

Franklin, Gene F.; Powell, J. David; Workman, Michael L., "Digital Control of Dynamic Systems," 2$^{nd}$ Ed., Addison–Wesley Publishing Co., Jun. 1990, pp. 703–747.

R.K. Oswald, "Design of a Disk File Head–Positioning Servo," IBM Journal of Research and Development, vol. 18, No. 6, Nov. 1974, pp. 506–512.

* cited by examiner

*Primary Examiner*—David Hudspeth
*Assistant Examiner*—Mitchell Slavitt
(74) *Attorney, Agent, or Firm*—Kirk A. Cesari

(57) ABSTRACT

A method and apparatus for a settling check based on a single time point is described. A settling criterion for head oscillations in a disc drive is calculated using head position data. The settling criterion is used to determine when the head position data remains within a predetermined limit based on head position data values at a single point in time. The apparatus includes an actuator in a disc drive system including a head coupled to the actuator to generate a head position signal and a servo controller to receive the head position signal to determine when the head position signal remains within a threshold. The settling criterion could either be an elliptical settling criterion in one embodiment, or a triangular settling criterion in another embodiment.

20 Claims, 10 Drawing Sheets

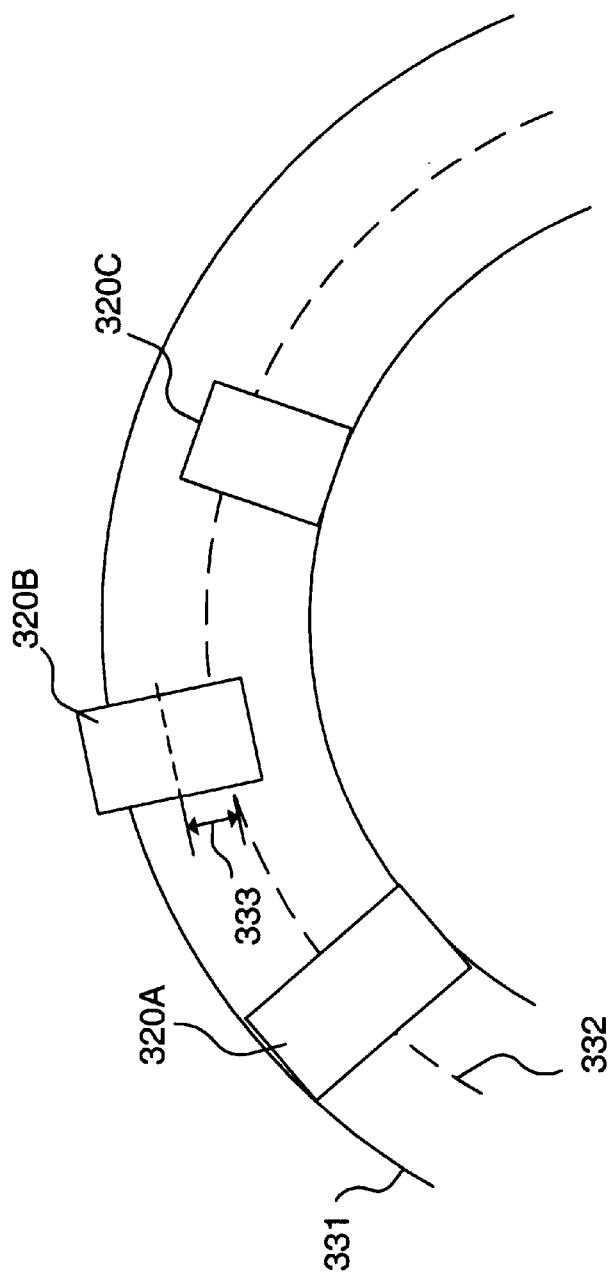

METHOD AND APPARATUS FOR SETTLING DETERMINATION CONTROL SYSTEMS

CROSS-REFERENCE TO RELATED APPLICATION

This application claims the benefit of U.S. Provisional Application Serial No. 60/112,264, filed Dec. 15, 1998, entitled "Settle Criterion For High Track Density Storage System In The Presence Of Low Frequency External Disturbance", and which is herein incorporated by reference.

BACKGROUND OF THE INVENTION

1. Field of the Invention

This invention relates to the field of control systems and, more specifically, to settling criterion used in control systems such as for use in disc drive systems.

2. Description of Related Art

The trend in system design is toward faster response times and increased robustness to system variations, for example, resonance. Resonance is a phenomenon that occurs in different types of systems, including mechanical, electrical, and acoustical systems. Many systems, for example, disc drive systems, become unstable in the presence of resonance.

A disc drive system typically consists of one or more discs and control mechanisms for storing data on the discs. Data is stored within concentric tracks on a disc. The reading and writing of data is typically accomplished with a head flown over the disc surface on a thin air bearing. The head is positioned on a desired track using an actuator connected by a support arm assembly to the head. The actuator moves the head in a radial direction to the desired track where it is maintained over the track centerline during both read and write operations. A motor is used to rotate the discs to position the head at a particular location along the desired track.

The movement of the head to the desired track is referred to as track seeking. After a track seek operation, the motion of the head must settle before a read or write operation may be performed. Once the head has settled, it must be maintained over the track's centerline, referred to as track following. A servo control system is used to maintain the head precisely over the track centerline after a track seek is performed. This is accomplished by using prerecorded position information (servo information) either on a dedicated servo disc or on sectors interspersed between data on the data disc.

The servo information is sensed by a head and demodulated to generate a position error signal (PES). The PES indicates the position of the head relative to the target track centerline. During seeking, the PES is used to maintain desired head velocity and positioning, and to determine when a head has settled according to a settling criterion. During settling, disturbances in the system may cause the head to oscillate around the track centerline. These disturbances may significantly contribute to the PES such that the system must wait for a period of time until the head is sufficiently settled in order to perform a read or write operation. A settling criterion is a manner of checking that the PES is ensured to be within a predetermined threshold window (e.g., the head has sufficiently settled over the track centerline) that enables a read or write operation to be performed.

FIG. 1 illustrates one prior method for determining the settling criterion for a servo system. The settling criterion is based on the pole locations of the dominant complex pole pair of the closed loop transfer function for the servo system. With prior settling criterion, during a read operation, a head is determined to be settled when the position error signal is continuously within a read threshold for at least one half period of the oscillatory frequency of the dominant pole of the transfer function. For example, if the closed loop transfer function has an oscillatory frequency of 1 KHz, the head is determined to be settled when the PES is within the read threshold for a period of 0.5 milliseconds or more. The industry trend, however, is toward decreasing data access times by faster positioning of head assemblies over data locations (i.e., decreasing seek and settle times). With average seek times typically under 10 ms, the settling time period becomes significant. As such, prior settling criterion may significantly contribute to high data access times.

Another problem with such a settling criterion is that the criterion assumes that disturbances are relatively small compared to the system transfer function and thus, can be neglected. Disturbance resonance, for example, generates bias forces that tend to move the head away from the centerline of the track. These forces may be caused by such things as the movement of a flex cable in the actuator connecting the head to the read/write electronics in the disc drive. The movement of the flex cable causes head oscillations at the end of a seek movement, referred to as seek-pumped-resonance. The resonance frequency may typically range from 100 Hz to 180 Hz. In actual operations; the disturbances may be significant compared with system transfer functions and cannot be neglected.

SUMMARY OF THE INVENTION

The present invention pertains to a method and apparatus for settling determination in a disc drive control system. The method includes calculating a settling criterion for a parameter using one or more data values. The method may also include determining when the parameter remains within a predetermined limit. The determination may be performed on the data values at a single time point using the settling criterion.

The apparatus includes an actuator in a disc drive system including a head coupled to the actuator to generate a head position signal and a servo controller to receive the head position signal to determine when the head position signal remains within a threshold. The settling criterion could either be an elliptical settling criterion in one embodiment, or a triangular settling criterion in another embodiment.

Additional features and advantages of the present invention will be apparent from the accompanying drawings and from the detailed description that follows.

BRIEF DESCRIPTION OF THE DRAWINGS

The present invention may be better understood, and its numerous objects, features, and advantages made apparent to those skilled in the art by referencing the accompanying drawings. For ease of understanding and simplicity, common numbering of elements within the illustrations is employed where an element is the same in different drawings:

FIG. 3A illustrates head oscillations around a track centerline;

DETAILED DESCRIPTION OF THE INVENTION

In the following description, numerous specific details are set forth such as examples of specific materials, processes, dimensions, etc. in order to provide a thorough understanding of the present invention. It will be apparent, however, to one skilled in the art that these specific details need not be employed to practice the present invention. In other instances, well known materials or methods have not been described in detail in order to avoid unnecessarily obscuring the present invention.

The method and apparatus described herein may be implemented with a wide variety of systems including acoustical, mechanical, and electrical systems. For example, the settling criteria described herein may be used to provide control of disturbances in a disc drive system, as discussed below. It should be noted, however, that the settling criteria are described in relation to a disc drive system only for illustrative purposes and is not meant to be limited to control of disturbances in disc drive systems.

A settling criterion for improved control of a plant is described. A plant is a controlled element in a system that may be, for examples, a process, an article, and/or a machine. A control method is employed to control particular values or conditions of the plant in response to disturbances that influence the behavior of the plant.

In one embodiment, the plant may be an actuator within a disc drive that controls the position of a head over a disc. The method may include calculating a settling criterion for head oscillations using head position data. The settling criterion is used to determine when the head position data remains within a predetermined limit based on head position data values at a single point in time.

Figure 1:
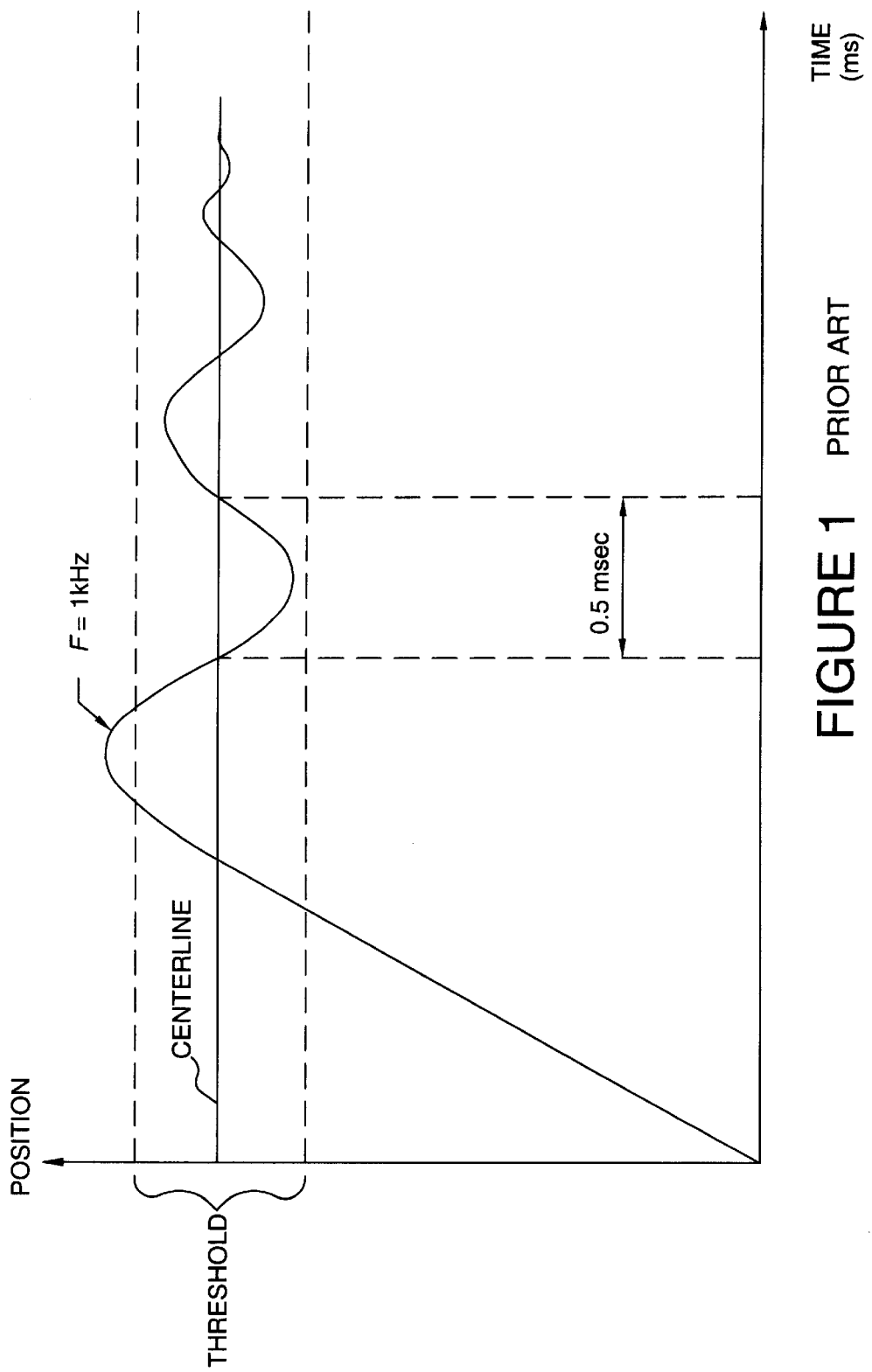
FIG. 1 illustrates one prior method for determining the settling criterion for a servo system.
Figure 2A:
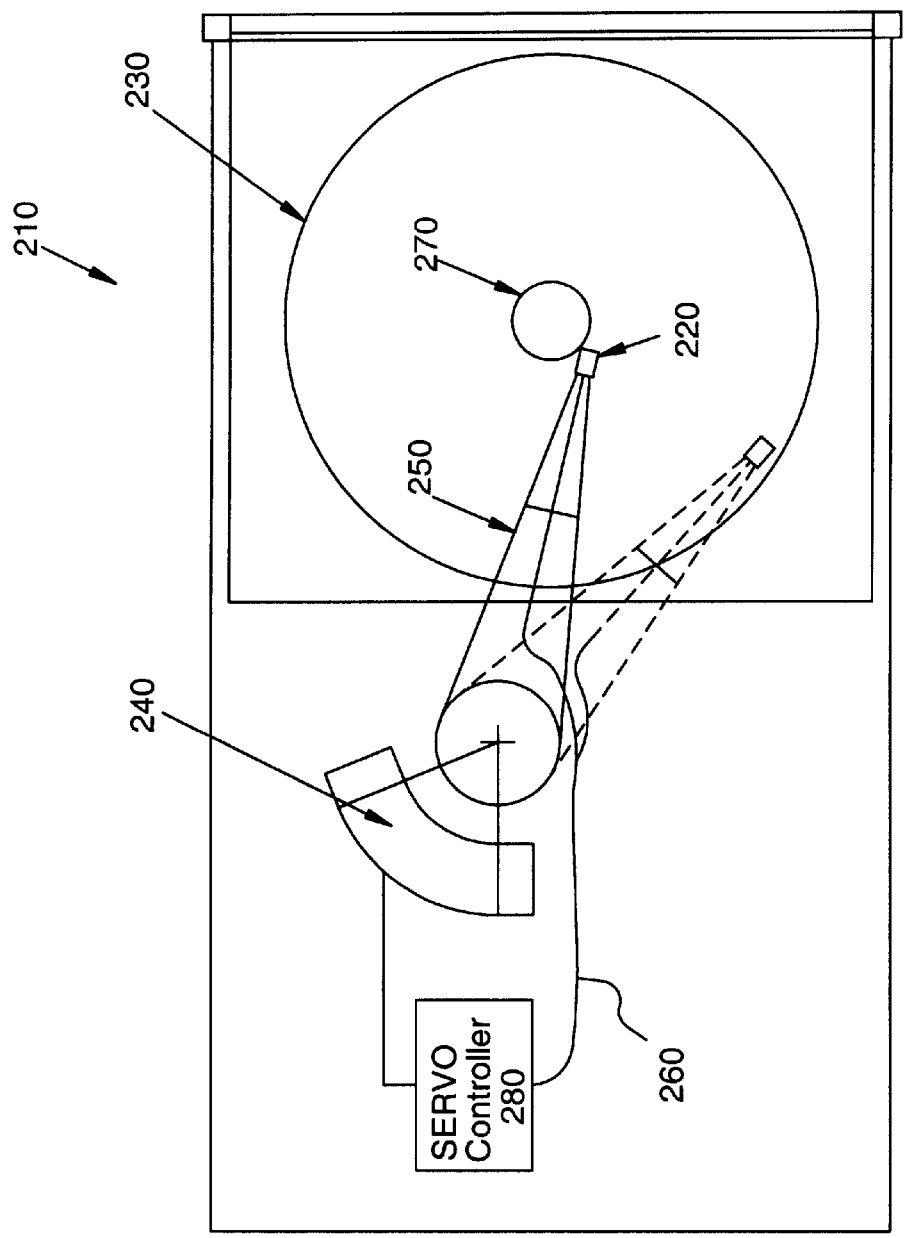
FIG. 2A illustrates one embodiment of a disc drive system implementing a single time point settling criterion.

FIG. 2A illustrates one embodiment of a disc drive system implementing a settling criterion based on a single time point. The disc drive 210 includes disc 230, spindle motor 270, head 220, actuator 240, support arm 250, flex cable 260, and servo controller 280. Data is stored within concentric tracks on disc 230. Head 220 is used to read and write data on disc 230. Head 220 is positioned over a desired track using actuator 240 that is connected to head 220 by support arm 250. Actuator 240 moves support arm 250 and, thereby, head 220 in a radial direction to the desired track. Head 220 is maintained over the track centerline during both read and write operations. Spindle motor 270 is used to rotate disc 230 to position head 220 at a particular location along the desired track. It will be apparent to one skilled in the art that disc drive 210 may include as few as one head 220 and one disc 230 or, in alternative embodiments, may include multiple discs with each side of a disc having a corresponding head and support arm assembly.

In one embodiment, actuator 240 is a voice coil motor (VCM) containing a coil that is movable in a magnetic field of a magnetic stator. Applying current to the VCM causes the coil to move which, in turn, causes actuator arm 250 and, thus, head 220 to move in a radial direction across disc 230. The acceleration of the coil is proportional to the applied current. In another embodiment, actuator 240 may be another type of motor, as for example, a stepper motor.

The track information may be incorporated into disc 230 and read by head 220. In one embodiment, disc 230 is a dedicated servo disc that contains the track information. In another embodiment, disc 230 is a data disc where the track information is contained on sectors interspersed between data on disc 230.

In one embodiment, flex cable 260 connects head 220 with servo controller 280. Head 220 reads and transmits track information from disc 230 to servo controller 280. The servo controller 280 uses the track information to maintain head 220 precisely aligned over a track centerline on disc 230. The track information is demodulated to generate a position error signal (PES) indicating the position of head 220 away from the nearest track centerline. The PES is used in the servo controller feedback loop to generate a control signal to actuator 240 to maintain head 220 over the track centerline.

Figure 2B:
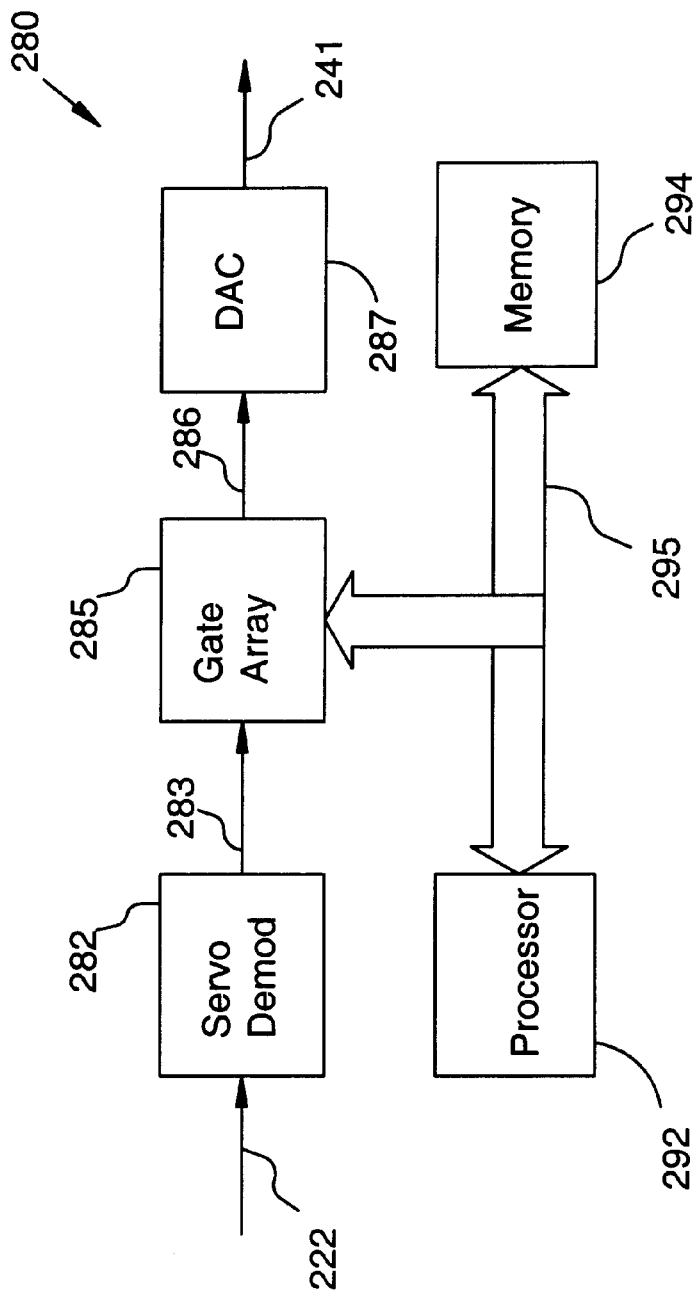
FIG. 2B illustrates one embodiment of a servo controller.

FIG. 2B illustrates one embodiment of a servo controller. In one embodiment, servo controller 280 includes processor 292, memory 294, and gate array 285, that are coupled together via data bus 295. Track information 222, read by head 220 of FIG. 2A, is transmitted to servo demodulator 282. Servo demodulator 282 demodulates track information 222 to generate PES 283. PES 283 is converted into a digital signal by gate array 285 and transmitted to processor 292. Processor 292 is used to compute a control signal 241 that is used to maintain head 220 along a desired track centerline position. Digital control signal 286 is transmitted by processor 292 to digital-to-analog converter (DAC) 287. DAC 287 provides analog control signal 241 to actuator 240 of FIG. 2A which positions head 220 based on the computation of processor 292. Servo demodulators, gate arrays, DACs, processors, and memories are all well known in the art; accordingly, a more detailed description of their operation is not provided herein. These components may be obtained from industry manufacturers, such as: Texas Instruments of Dallas, Tex.; Cypress Semiconductor of San Jose, Calif.; National Semiconductor of Santa Clara, Calif.; and Xilinx of San Jose, Calif.

FIG. 3A illustrates head oscillations around a track centerline. Head 220 of FIG. 2A is shown at three different head positions 320A, 320B, and 320C relative to the centerline 332 of a track 331. Head 220 of FIG. 2A is positioned directly over centerline 332 at head position 320A. The middle of head 220 of FIG. 2A is displaced away from centerline 332 at head positions 320B and 320C. During operation of the actuator, disturbances in the system may cause head oscillations around centerline 332 resulting in head positions 320B and 320C. For example, resonant frequencies transmitted via flex cable 260 to head 220 of FIG. 2A at or near the bandwidth of the system may lead to instabilities in the system.

During track seeking, these disturbances may not have a significant affect on head 220 positioning since the primary contribution to the total forces on head 220 most likely comes from the current applied to actuator 240 of FIG. 2A. However, during settling, such disturbances may become a primary contributor to head position error by causing head oscillations around track centerline 332, as shown by head positions 320B and 320C of FIG. 3A. The distance 333 of head position 320B away from centerline 332, for example, is used to determine the PES as discussed above in reference to FIG. 2A. The demodulation of track information to generate a PES is well known in the art and, accordingly, a more detailed discussion is not provided herein.

Figure 3B:
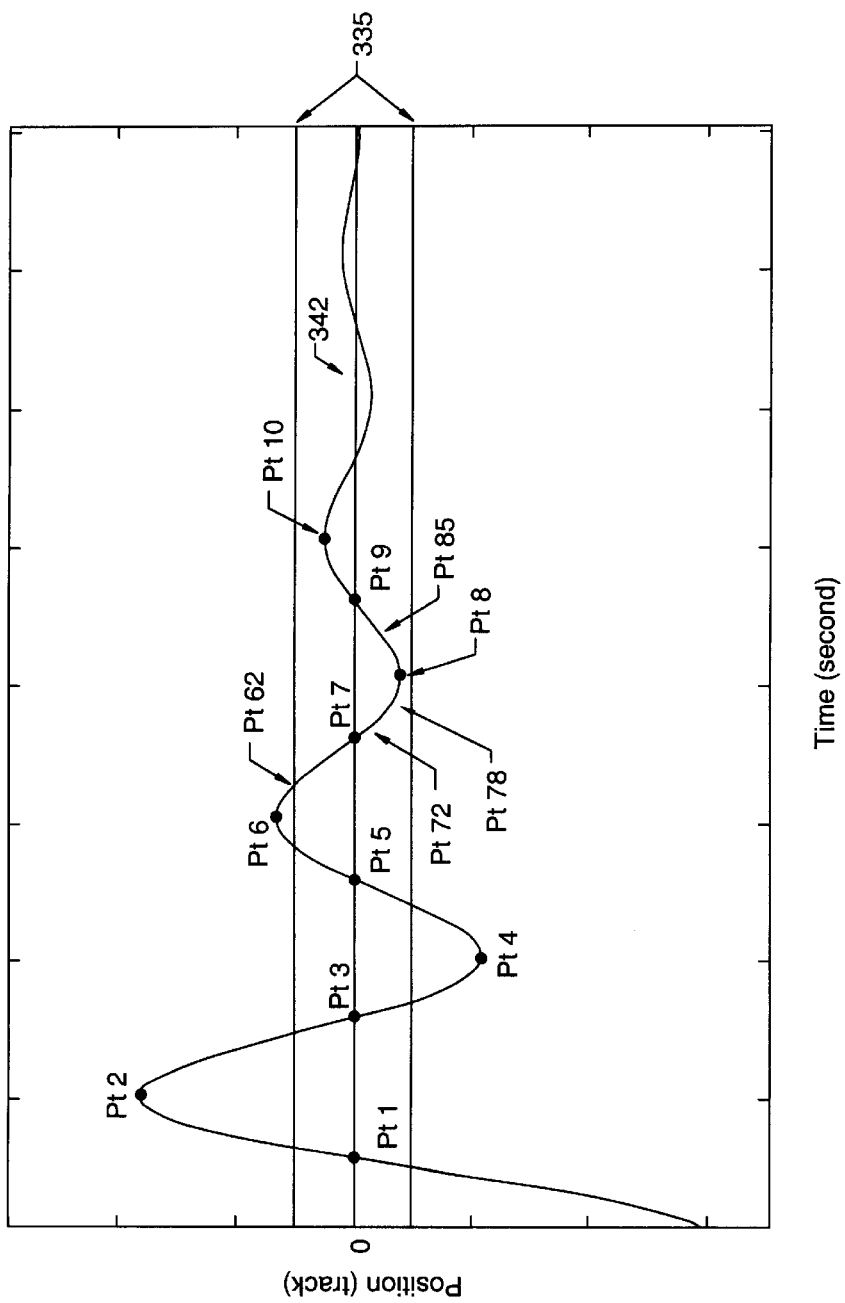
FIG. 3B illustrates a plot of one embodiment of a position error signal over time.

FIG. 3B illustrates a plot of one embodiment of a PES over time. In the embodiment illustrated in FIG. 3B, the head oscillation results in a sinusoidal function of PES over time. Zero value 342 represents track centerline position 332 of FIG. 3A. The PES deviates from zero value 342 in a sinusoidal manner where the amplitude of the sinusoidal function decays with increasing time.

At position $P_{t1}$, the head is positioned over the centerline of a desired track, similar to head position 320A of FIG. 3A. The velocity of the head causes it to move past the track centerline to position $P_{t2}$, similar to head position 320B of FIG. 3A. At position $P_{t2}$, the head has zero velocity as it changes direction and moves back toward the centerline. At position $P_{t4}$, the head has moved past the centerline in an opposite direction, similar to head position 320C of FIG. 3A. As the head continues to oscillate around the track centerline, the magnitude of the PES relative to the zero position 342 continues to diminish at subsequent positions $P_{t5}$, $P_{t6}$, $P_{t7}$, $P_{t8}$, $P_{t9}$, and $P_{t10}$. Positions $P_{t72}$ and $P_{t78}$ represent positions at points in time for which the head is determined to be settled using different embodiments of the settling criterion as discussed in detail below.

Before data can be read from or written to a disc, the head must be settled after the seek movement. Threshold limits 335 for head oscillations around a track center are determined for which the system is sufficiently settled to perform read or write operations. Although the read and write threshold ranges may be different, similar settling criterion may be used for both read and write operations. As such, the following discussion of a settling criterion for read operations is only for illustrative purposes, and may also be used for write operations. In one embodiment, a settling criterion is used that evaluates the head position at one point in time, rather than a period of time.

Figure 4:
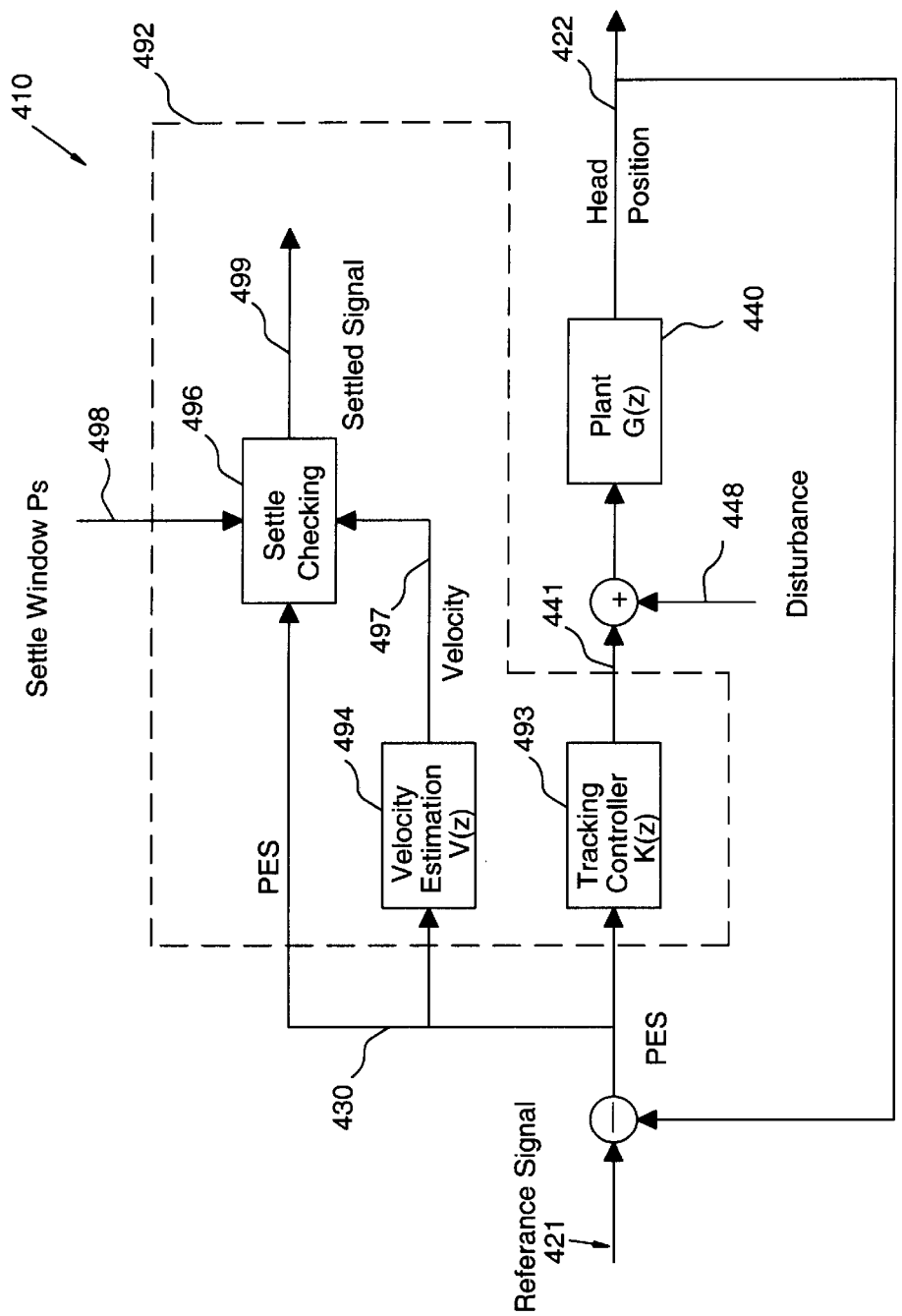
FIG. 4 illustrates one embodiment of a servo loop.

FIG. 4 illustrates one embodiment of a servo loop for a system utilizing this invention. Servo loop 410 includes plant 440, controller 493, velocity estimation 494, and settling check 496. In one embodiment, for example, plant 440 is an actuator 240 of FIG. 2A and the functions of block 492 are performed within processor 292 of FIG. 2B.

In one embodiment, actuator 440 controls the head position over a track centerline of a disc. Track position information 422 is fed back to the servo controller and subtracted from track centerline reference signal 421 to generate PES 430. PES 430 is used in the servo controller feedback loop to generate control signal 441 to the VCM to maintain head 220 over the track centerline.

Disturbances 448 in the system add to control signal 441, applied to plant 440, resulting in head oscillations around the track centerline. Disturbances 448 may significantly contribute to PES 430 such that the system must wait until the head is sufficiently settled in order to perform a read operation. A settling criterion is used to evaluate PES 430 to determine when it has settled within a predetermined threshold window to enable the read operation to be performed.

In one embodiment, the settling check 496 is performed using both position and velocity information. Velocity estimation 494 is performed using PES 430 as discussed in detail below. Settling check 496 uses PES 430 and velocity estimate 497 to determine when PES 430 remains settled within settling window 498 based on a settling criterion as discussed in detail below. When PES 430 is determined to be settled, settling check 496 outputs settled signal 499 indicating that a read or write operation may be performed.

Figure 5A:
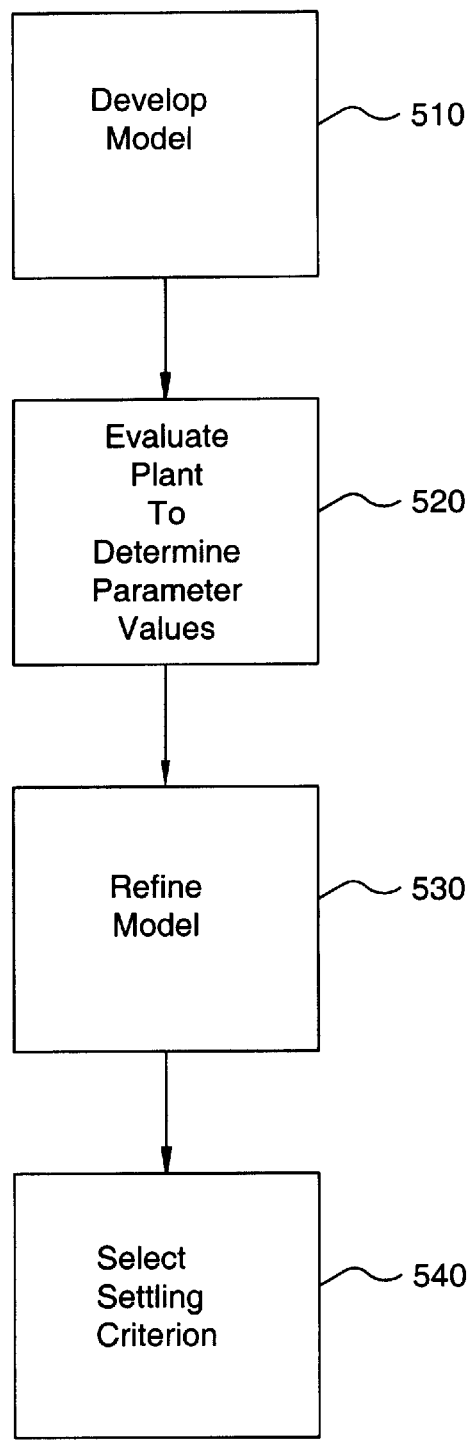
FIG. 5A illustrates one embodiment of a method for determining a settling criterion.

FIG. 5A illustrates one embodiment of a method for determining a settling criterion. In one embodiment, the following system parameters are determined based on evaluating computer simulations of the operation of a disc drive. In another embodiment, the following system parameters are determined by constructing and characterizing the performance of a prototype disc drive unit.

At step 510, a model is developed to characterize the behavior of the head position oscillation. In general, the dominant mode of the head position oscillations is assumed to have a sinusoidal function and is modeled by the following equation:

$$p(t)=P \cdot e^{-a \cdot t} \cdot \sin(\omega \cdot t + \theta) \tag{1}$$

where t is the time; P is the initial oscillating amplitude at time t=0; a is the decay rate; ω is the resonance frequency, θ is the phase angle to associate with the chosen time reference, and p(t) is the position error of the head for a given time. In one embodiment, for example, the dominant mode may be the seek-pumped-resonance and ω may vary from 100 Hz to 800 Hz. FIG. 3B illustrates one example of a trace for equation (1) corresponding to a damped oscillation frequency (f) of 100 Hz (where ω=2πf), an initial oscillation amplitude of 2 tracks, and a decay rate of 100 radians/second.

Referring back to FIG. 5A, at step 520, a disc drive is evaluated to determine a threshold range (e.g., settling window Ps 498 of FIG. 4) of the PES for which the disc drive can perform a read operation. In one embodiment, the system is assumed to be stable. For a stable system, the decay rate must be larger or equal to zero. As such, a value of zero is selected as the lower bound for the decay rate.

Because the sine function will always be between −1 and 1, the head position oscillation will be determined to be settled when the envelope of the amplitude falls with the read threshold as given by the following equation:

$$P \cdot e^{-a \cdot t} \leq Ps \tag{1}$$

At step 530, the model is refined based on assumptions of the system operation. In one embodiment, although the head position oscillation will be damped in a stable system, the oscillation may be assumed to be undamped in order to generate a worst case scenario. For undamped oscillations, the exponent term drops out of equation (2), and the amplitude is evaluated to determine if it is less than the read threshold. If the head position oscillation is within the read threshold under the undamped assumption, then the head position oscillation must also be within the read threshold under damped conditions. For undamped oscillations, the position error of the head may be defined by the following equation:

$$p(t)=P \cdot \sin(\omega \cdot t + \theta) \tag{3}$$

In one embodiment, the velocity of the head may be estimated by taking the derivative of the position error p(t). Thus, for example, the velocity equation in an undamped system may be found by taking the derivative of equation (3), as given by the following:

$$v(t)=d/dt\, p(t)=P \cdot \omega \cdot \cos(\omega \cdot t + \theta) \tag{4}$$

Similar velocity computation may be performed under damped conditions by taking the derivative of equation (1).

In another embodiment, the velocity of the head may be directly measured or estimated from other measured data.

At step 540, a settling criterion is selected such that the head oscillations may be declared settled at a single point in time, rather than a period of time. The settling criterion may be, for example, an elliptical settling criterion or a triangular settling criterion. The selection of a settling criterion may be made based on factors such as cost and available computing resources. For example the elliptic criterion requires the calculation of the squares of two variables, as discussed in detail below. If there is insufficient compute power available to perform a square function, then other functions may be used to simplify the computation.

In another embodiment, a triangular settling criterion (performing an absolute function) may be used. Although an absolute function requires less computation power than a square function, a triangular settling criterion may not be able to determine that a head has settled as quickly as an elliptical settling criterion as is discussed in detail below, with respect to FIG. 7.

Figure 5B:
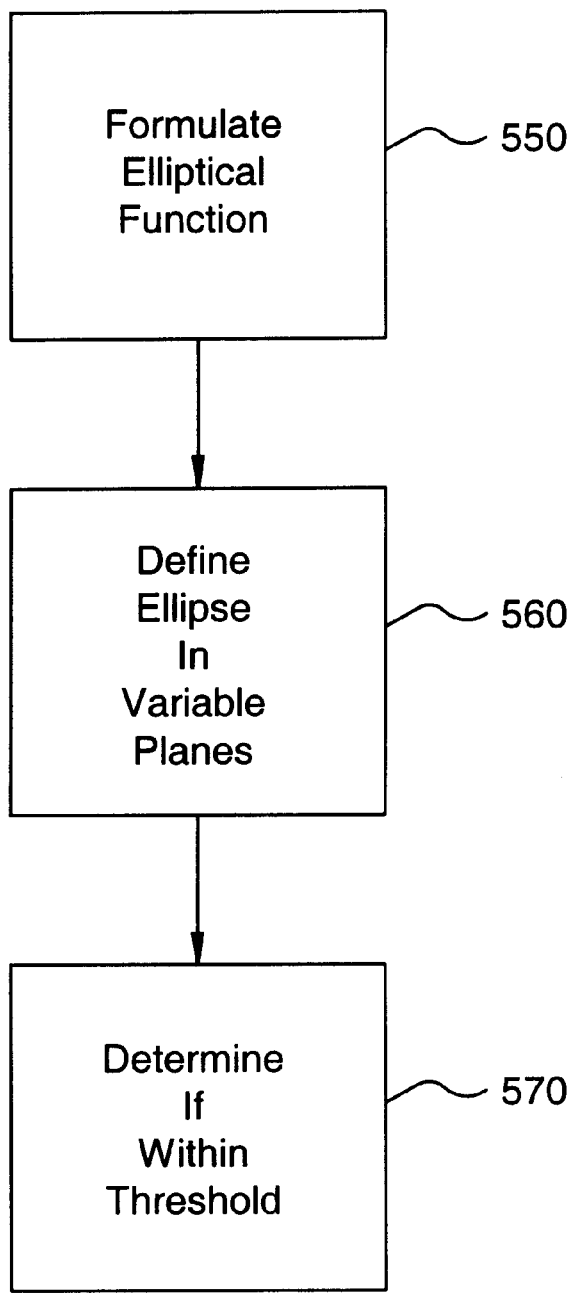
FIG. 5B illustrates one embodiment of an elliptical settling criterion.

FIG. 5B illustrates one embodiment of an elliptical settling criterion. An elliptical settling criterion is developed by formulating the position and velocity equations as an elliptical function, step 550. An ellipse is defined by the function $(x/a)^2 + (y/b)^2 = 1$. By dividing the position equation (3) by P and the velocity equation (4) by Pω (noting that $\sin^2\theta + \cos^2\theta = 1$), an ellipse is formulated:

$$\left(\frac{p(t)}{P}\right)^2 + \left(\frac{v(t)}{P \cdot \omega}\right)^2 = 1 \quad (5)$$

In one embodiment, at step 560, the ellipse of equation (5) may be defined in the v(t) versus p(t) plane by multiplying equation (5) by $P^2$, giving:

$$\left(\frac{p(t)}{1}\right)^2 + \left(\frac{v(t)}{\omega}\right)^2 = P^2 \quad (6)$$

The two radii of the v(t) vs. p(t) plane of equation (6) are P and P·ω, respectively. In one embodiment, the settling ellipse is constructed with the radii of Ps·ω and Ps. At any given point of a group of points, if the point (p,v) is within the settling ellipse then its corresponding elliptic trajectory will be within the settling ellipse. Therefore, the settling criterion becomes the following inequality check at a single point of time:

$$p(t)^2 + \left(\frac{v(t)}{\omega}\right)^2 \leq Ps^2 \quad (7)$$

In other words, in order for the system to be settled, the left side of equation (7) must be less than or equal to $Ps^2$. At step 570, the elliptical function is evaluated at a given point in time to determine if it is within the threshold.

Figure 6:
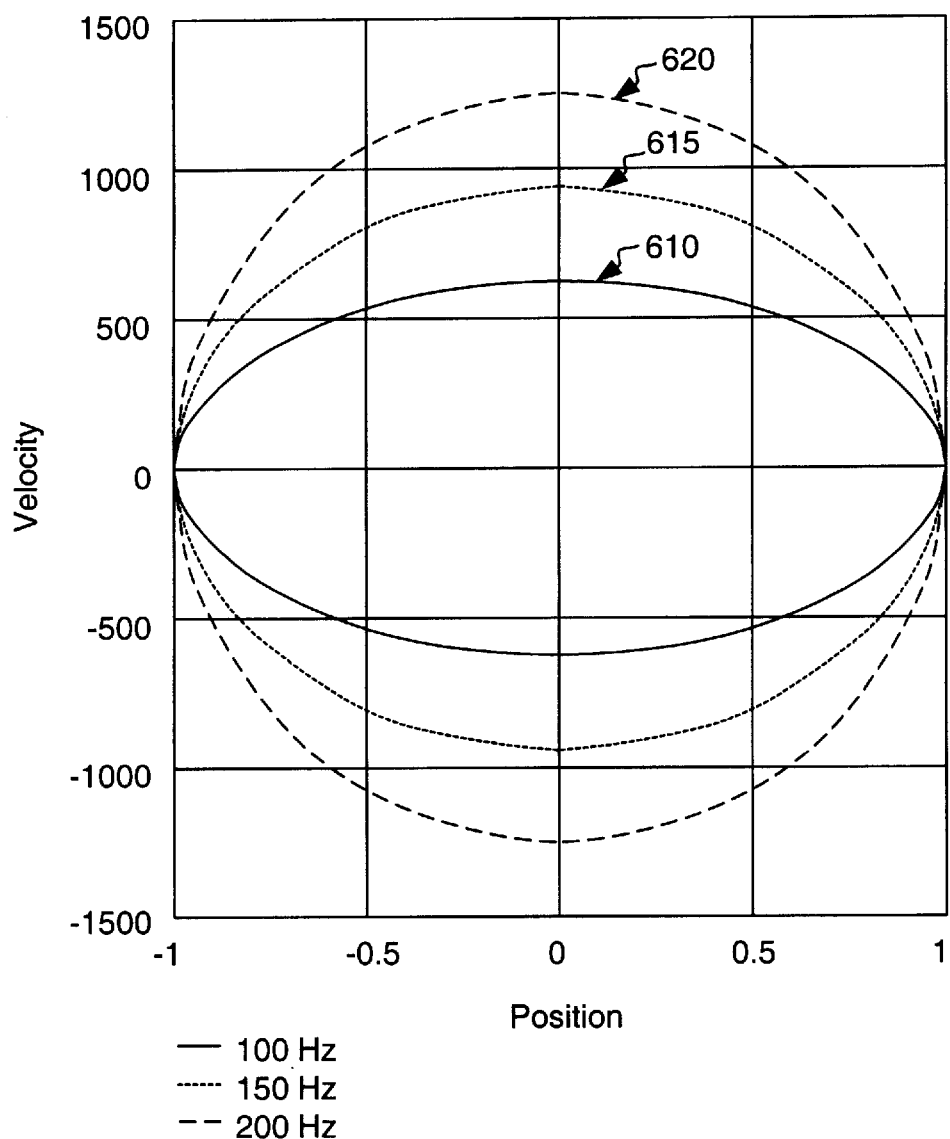
FIG. 6 illustrates plots of elliptic functions for different head oscillation frequencies.

A plot of equation (7) for different head oscillation frequencies, where ω=2πf, is illustrated in FIG. 6. The system is settled for points that are within the elliptical curves. Curves 610, 615, and 620 are plots of equation (7) in which the head oscillation frequency is 100 Hz, 150 Hz, and 200 Hz, respectively. The plots show that smallest frequency defines the worst case settling condition, as fewer points fall within the elliptical curve.

In an alternative embodiment, a triangular settling criterion is used. A triangular settling criterion is developed by formulating the position and velocity equations as a triangular function. The settling criterion becomes the following inequality check at a single point of time:

$$|p(t)| + \left|\frac{v(t)}{\omega}\right| \leq Ps \quad (8)$$

In other words, in order for the system to be settled, the left side of equation equation (8) must be less than or equal to Ps at any given point in time.

Figure 7:
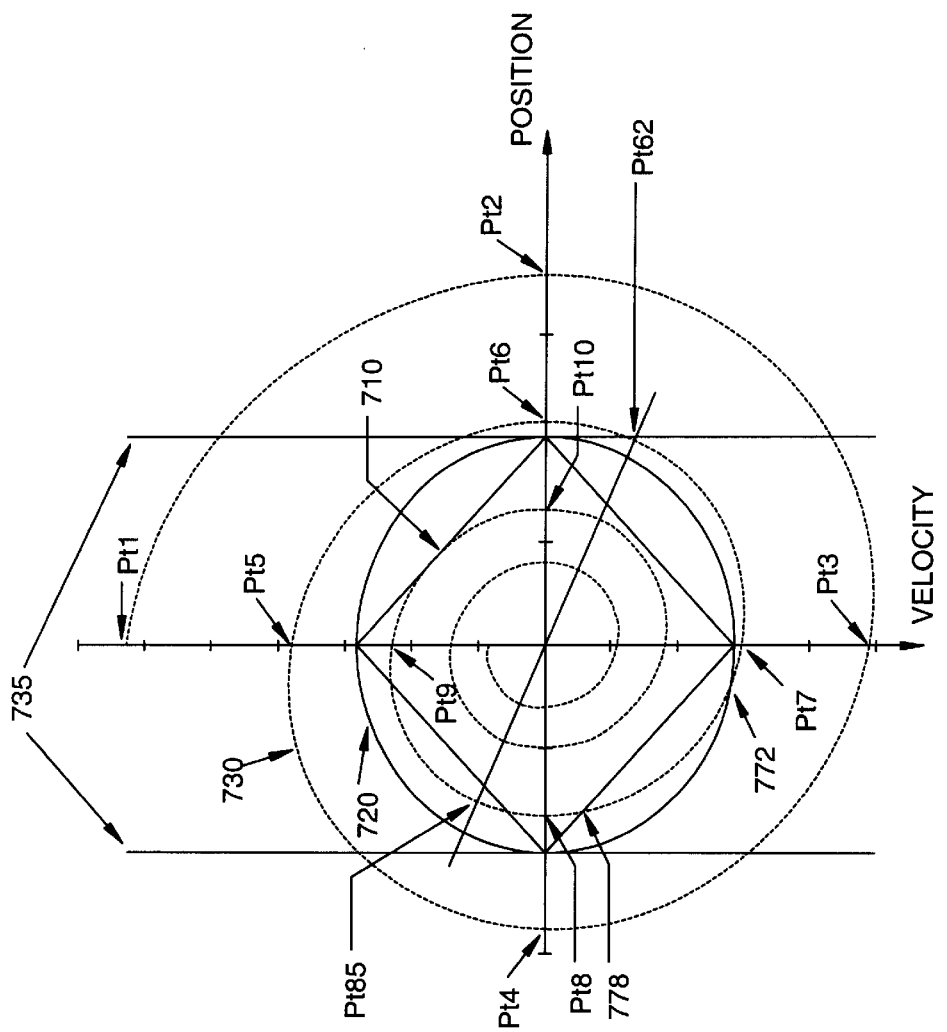
FIG. 7 illustrates a comparison between a position error signal trace and different embodiments of a settling criterion.

FIG. 7 illustrates a comparison between a position error signal trace and different embodiments of a settling criterion. FIG. 7 is a plot of position versus velocity for a PES trace, an elliptical settling criterion, and a triangular settling criterion. Spiral curve 730 is an example of a trajectory of the PES (with damped oscillations at 100 Hz) of FIG. 3B. The position equation (1) and its corresponding velocity equation are used to define spiral curve 730 in the position-velocity plane at different points in time (e.g., $t_1$, $t_2$, and $t_3$). Threshold limits 735 are the PES limits for which the system is determined to be settled in order to perform a read operation.

In one embodiment, if the decay rate is assumed to be zero, then as time t changes from 0 to ω/2π, the position changes from zero position, maximum velocity to maximum position, zero velocity. As this continues for every cycle of t, where the cycle time is ω/2π, it forms a closed elliptic shaped curve in the p-v plane. When the decay rate of equation (1) is greater than zero (as is the case during actual operation of a system), the curve is no longer closed because as t increases, the distance from a position on the curve to the origin (i.e., track centerline) decreases. Therefore, the curve forms a spiral that approaches the origin as t increases.

Ellipse 720 is the elliptical function defined by equation (7) and shown in FIG. 6 with a frequency of 100 Hz. Diamond 710 is the triangular function defined by equation (8), also with a frequency of 100 Hz. The positions $P_{t1}$ through $P_{t9}$ in FIG. 7 correspond to positions $P_{t1}$ through $P_{t9}$ in FIG. 3B.

With a prior settling criterion, a head is determined to be settled when the position error signal is continuously within the threshold for approximately one half period of its oscillatory frequency. As such, for the system shown in FIG. 3B, the system would have to wait until the PES has moved from position $P_{t62}$ to $P_{t85}$ (e.g., a time period of t85-t62) in order to declare the head settled, using the prior settling criterion. However, as shown in FIG. 7, the same PES could be declared settled at an earlier time using a settling criterion that is based on a single time point. For example, using a triangular settling criterion, the system could declare the head settled at position 778 just before $P_{t8}$. Whereas the system could declare the head settled at position 772 just after $P_{t7}$, using an elliptic settling criterion.

By using a settling criterion that performs a determination based on a single time point instead of a period of time, data access times of a disc drive system may be reduced. In an alternate embodiment, the settling criterion can also be performed based on additional time points, thereby increasing the reliability of the determination.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method of settling determination, comprising:
   calculating an elliptical settling criterion for a parameter using one or more data values; and
   determining when the parameter remains within a predetermined limit, the determination performed on the data values at a single time point using the settling criterion.

2. The method of claim 1, wherein the one or more data values include position data and velocity data, and wherein the parameter is a position signal.

3. The method of claim 2, further comprising estimating the velocity data from the position data.

4. The method of claim 3, wherein calculating the elliptical settling criterion comprises calculating the squares of the position data and the velocity data.

5. The method of claim 4, wherein the determination comprises determining when the squares of the position data and the velocity data are less than the predetermined limit at the single time point.

6. A method of settling determination, comprising:
   calculating a triangular settling criterion for a parameter using one or more data values; and
   determining when the parameter remains within a predetermined limit, the determination performed on the data values at a single time point using the settling criterion.

7. The method of claim 6, wherein calculating the triangular settling criterion comprises calculating the absolute values of the position data and velocity data.

8. The method of claim 7, wherein the determination comprises determining when the absolute values of the position data and the velocity data are less than the predetermined limit at the single time point.

9. A method of system design, comprising:
   developing a model of the behavior of a plant;
   evaluating the plant to determine a threshold range of a parameter of the plant; and
   developing an elliptical settling criterion for determining when the parameter of the plant is within the threshold range.

10. The method of claim 9, further comprising refining the model based on assumptions of the operation of the plant.

11. The method of claim 9, wherein developing the elliptical settling criterion comprises:
    formulating variables of the plant as an elliptical function;
    defining the elliptical functions in planes of the variables; and
    using the elliptical function to determine at a time point when the parameter remains within the threshold range.

12. The method of claim 11, wherein the variables are position and velocity.

13. A method of system design, comprising:
    developing a model of the behavior of a plant;
    evaluating the plant to determine a threshold range of a parameter of the plant; and
    developing a triangular settling criterion for determining when the parameter of the plant is within the threshold range.

14. The method of claim 13, wherein developing the triangular settling criterion comprises:
    formulating variables of the plant as a triangular function;
    defining the triangular functions in planes of the variables; and
    using the triangular function to determine at a time point when the parameter remains within the threshold range.

15. A disc drive system, comprising:
    an actuator;
    a head coupled to the actuator to generate a head position signal; and
    a servo controller coupled to receive said head position signal to determine when said head position signal remains within a threshold, based on a single time point, the determination performed using an elliptical settling criterion.

16. The disc drive system of claim 15, wherein a velocity of the head is used to generate a head velocity signal and wherein the elliptical settling criterion calculates when the head position signal remains within the threshold using the head position signal and the head velocity signal.

17. The disc drive system of claim 16, wherein the elliptical settling criterion calculates the squares of the head position and head velocity signals.

18. A disc drive system, comprising:
    an actuator;
    a head coupled to the actuator to generate a head position signal; and
    a servo controller coupled to receive said head position signal to determine when said head position signal remains within a threshold, based on a single time point, the determination performed using a triangular settling criterion.

19. The disc drive system of claim 18, wherein a velocity of the head is used to generate a head velocity signal and wherein the triangular settling criterion calculates when the head position signal remains within the threshold using the head position signal and the head velocity signal.

20. The disc drive system of claim 19, wherein the triangular settling criterion calculates the absolute values of the head position and head velocity signals.

* * * * *